US012401016B2

United States Patent
Ryu et al.

(10) Patent No.: US 12,401,016 B2
(45) Date of Patent: Aug. 26, 2025

(54) METHOD OF MANUFACTURING NEGATIVE ELECTRODE FOR ALL-SOLID-STATE BATTERIES

(71) Applicant: LG Energy Solution, Ltd., Seoul (KR)

(72) Inventors: Ji Hoon Ryu, Daejeon (KR); Eun Bee Kim, Daejeon (KR); Jung Pil Lee, Daejeon (KR); Suk Woo Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 758 days.

(21) Appl. No.: 17/608,555

(22) PCT Filed: May 13, 2020

(86) PCT No.: PCT/KR2020/006241
§ 371 (c)(1),
(2) Date: Nov. 3, 2021

(87) PCT Pub. No.: WO2020/242095
PCT Pub. Date: Dec. 3, 2020

(65) Prior Publication Data
US 2022/0223830 A1     Jul. 14, 2022

(30) Foreign Application Priority Data

May 24, 2019   (KR) .................. 10-2019-0061042

(51) Int. Cl.
*H01M 4/04*     (2006.01)
*H01M 4/02*     (2006.01)
(Continued)

(52) U.S. Cl.
CPC ......... *H01M 4/049* (2013.01); *H01M 4/0471* (2013.01); *H01M 4/139* (2013.01);
(Continued)

(58) Field of Classification Search
CPC .... H01M 4/049; H01M 4/0471; H01M 4/139; H01M 4/587; H01M 4/622; H01M 4/625;
(Continued)

(56) References Cited

U.S. PATENT DOCUMENTS 9,711,297 B2     7/2017  Raman et al.
2011/0027662 A1* 2/2011  Nishimura ........ H01M 10/0567
                                                  429/199

(Continued)

FOREIGN PATENT DOCUMENTS

CN     102610774 A      7/2012
CN     102844929 A      12/2012
(Continued)

OTHER PUBLICATIONS

Extended European Search Report including Written Opinion for Application No. 20815697.6 dated May 31, 2022, pp. 1-7.
(Continued)

*Primary Examiner* — Adam A Arciero
(74) *Attorney, Agent, or Firm* — Lerner David LLP

(57) ABSTRACT

Disclosed is a method of manufacturing a negative electrode for all-solid-state batteries, the method including (a) preparing a powder mixture including a negative electrode active material, a solid electrolyte, and a conductive agent, (b) introducing the powder mixture into a reactor, (c) introducing an electrolytic solution into the reactor, and (d) forming a solid electrolyte interface (SEI) film while rotating the reactor, wherein the inner surface of the reactor is treated with lithium metal.

10 Claims, 3 Drawing Sheets

(51) Int. Cl.
  *H01M 4/139* (2010.01)
  *H01M 4/587* (2010.01)
  *H01M 4/62* (2006.01)
  *H01M 10/0525* (2010.01)
  *H01M 10/0565* (2010.01)

(52) U.S. Cl.
  CPC .......... *H01M 4/587* (2013.01); *H01M 4/622* (2013.01); *H01M 4/625* (2013.01); *H01M 10/0525* (2013.01); *H01M 10/0565* (2013.01); H01M 2004/027 (2013.01); H01M 2300/0082 (2013.01)

(58) Field of Classification Search
  CPC ......... H01M 10/0525; H01M 10/0565; H01M 2004/027; H01M 2300/0082; H01M 4/366; H01M 2300/0068; H01M 4/1393; H01M 4/133; H01M 4/62; H01M 10/0562; H01M 4/13; H01M 10/4235; H01M 2220/30; H01M 4/0459; H01M 10/052
  See application file for complete search history.

(56) References Cited

U.S. PATENT DOCUMENTS

| | | | |
|---|---|---|---|
| 2011/0311864 A1* | 12/2011 | Yamada | H01M 4/366 429/188 |
| 2013/0273437 A1 | 10/2013 | Yoshioka et al. | |
| 2013/0288130 A1 | 10/2013 | Sheem et al. | |
| 2015/0147659 A1 | 5/2015 | Kato | |
| 2016/0126543 A1 | 5/2016 | Ota et al. | |
| 2016/0351893 A1 | 12/2016 | Wietelmann et al. | |
| 2017/0077548 A1 | 3/2017 | Omori et al. | |
| 2017/0309890 A1 | 10/2017 | Shin et al. | |
| 2019/0198854 A1 | 6/2019 | Sumiya et al. | |
| 2019/0305298 A1 | 10/2019 | Chae et al. | |
| 2020/0006819 A1 | 1/2020 | Lee et al. | |
| 2020/0106094 A1 | 4/2020 | Ota et al. | |

FOREIGN PATENT DOCUMENTS

| | | |
|---|---|---|
| CN | 104868169 A | 8/2015 |
| CN | 104993104 A | 10/2015 |
| CN | 106684426 A | 5/2017 |
| CN | 108232318 A | 6/2018 |
| CN | 109075340 A | 12/2018 |
| EP | 3451426 A1 | 3/2019 |
| JP | 2012204306 A | 10/2012 |
| JP | 5435469 B2 | 3/2014 |
| JP | 2017050248 A | 3/2017 |
| JP | 2017059325 A | 3/2017 |
| JP | 2017513177 A | 5/2017 |
| JP | 2017534164 A | 11/2017 |
| KR | 20040071510 A | 8/2004 |
| KR | 20120073603 A | 7/2012 |
| KR | 20130122469 A | 11/2013 |
| KR | 20150062989 A | 6/2015 |
| KR | 20160060171 A | 5/2016 |
| KR | 101642812 B1 | 7/2016 |
| KR | 20180127044 A | 11/2018 |
| WO | 2017188388 A1 | 11/2017 |
| WO | 20190054729 A1 | 3/2019 |

OTHER PUBLICATIONS

International Search Report for PCT/KR2020/006241 dated Sep. 1, 2021. 2 pgs.

* cited by examiner

【FIG. 1】
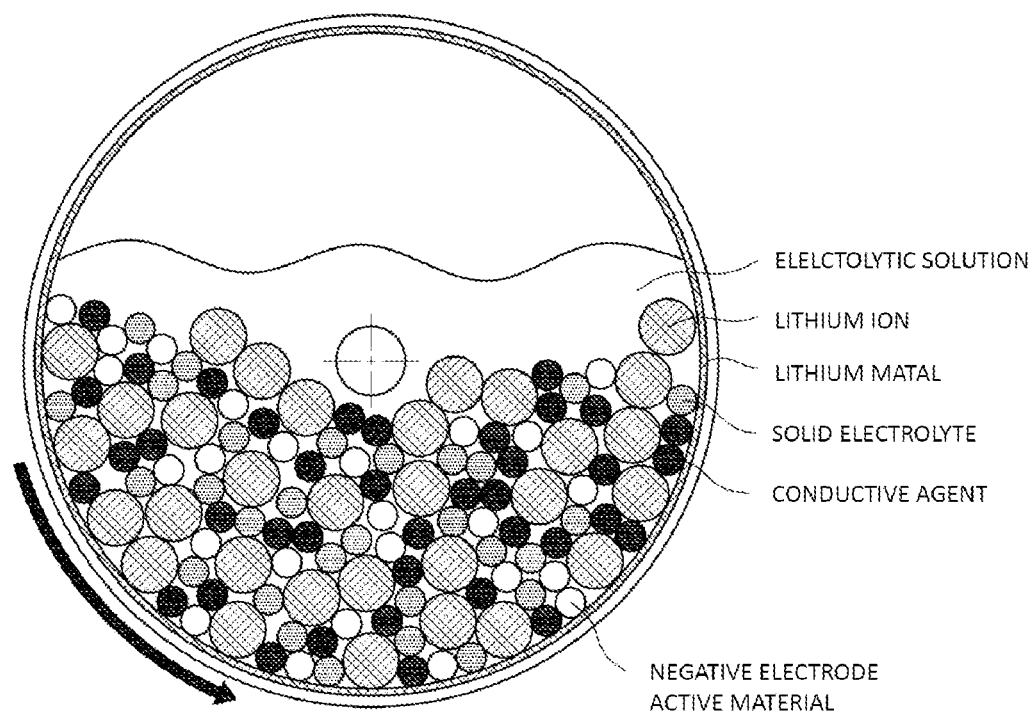

[FIG. 2]
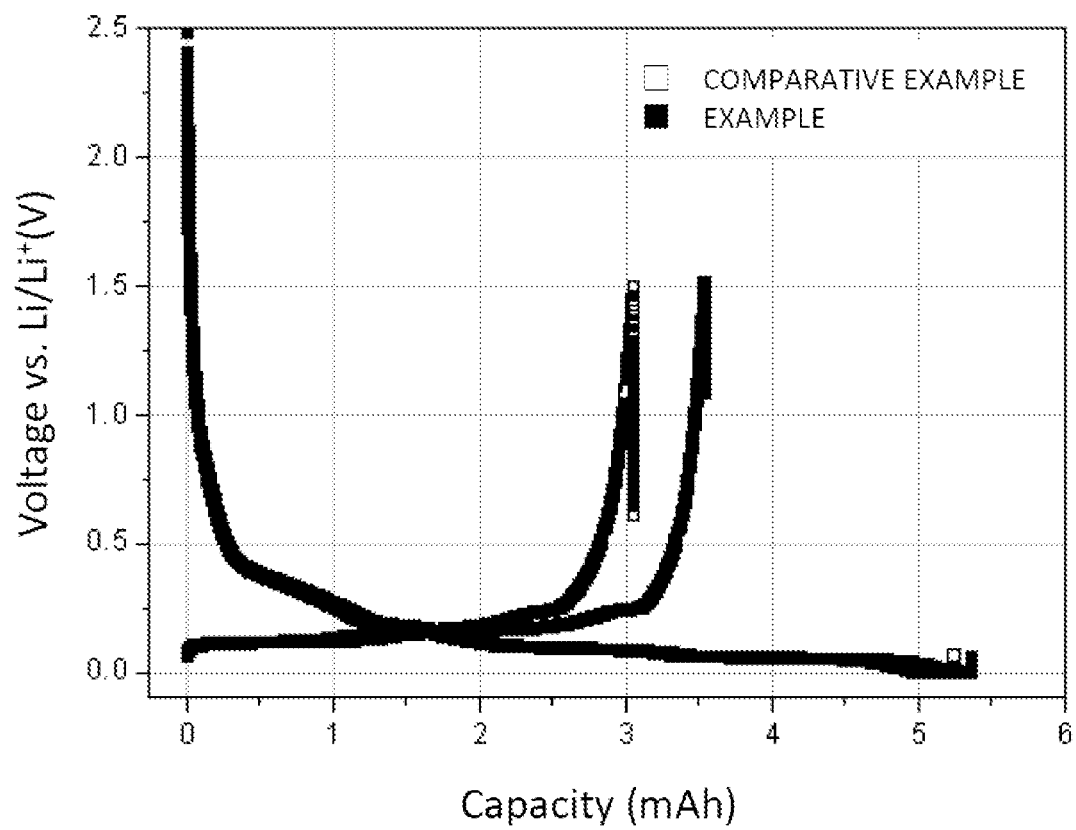

[FIG. 3]
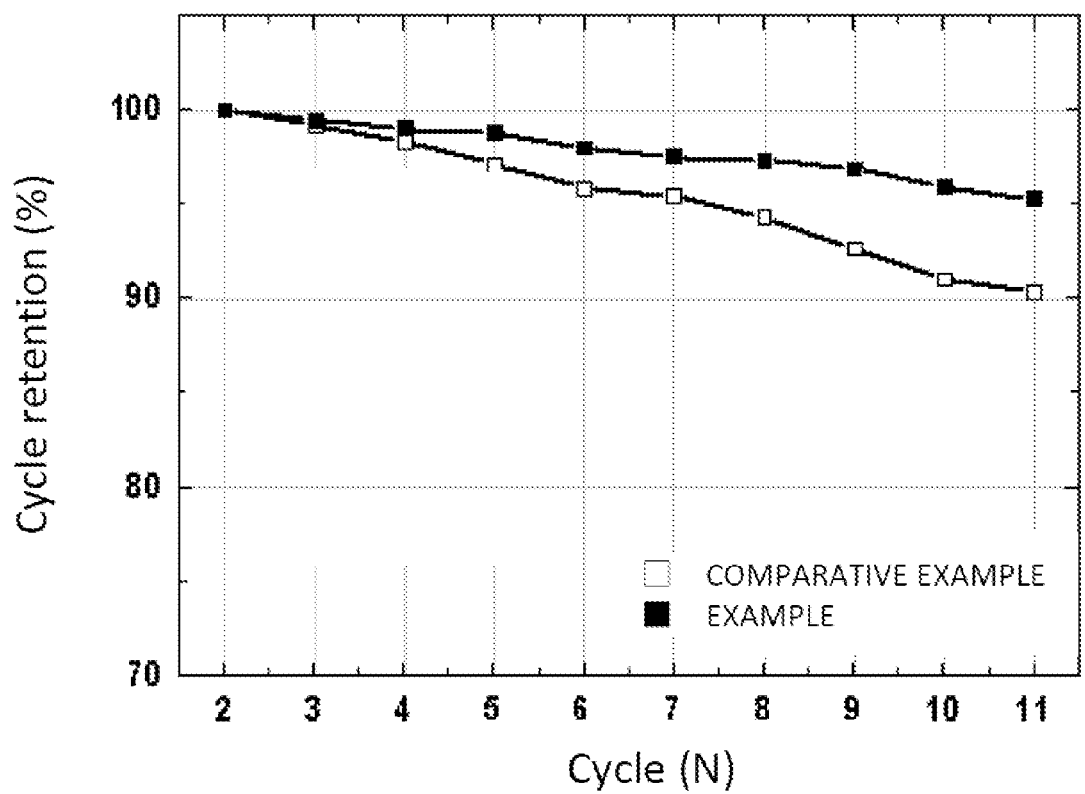

METHOD OF MANUFACTURING NEGATIVE ELECTRODE FOR ALL-SOLID-STATE BATTERIES

CROSS-REFERENCE TO RELATED APPLICATION(S)

The present application is a national phase entry under 35 U.S.C. § 371 of International Application No. PCT/KR2020/006241 filed May 13, 2020, which claims the priority from Korean Patent Application No. 10-2019-0061042, filed May 24, 2019, all of which are incorporated herein by reference.

TECHNICAL FIELD

The present invention relates to a method of manufacturing a negative electrode for all-solid-state batteries, and more particularly to a method of manufacturing a negative electrode for all-solid-state batteries capable of forming a solid electrolyte film that exhibits stable properties by mixing a negative electrode active material, a solid electrolyte, and a conductive agent in a reactor having an inner surface treated with lithium metal.

BACKGROUND ART

With multifunctionalization of mobile electronic devices, including mobile phones, demand for lithium secondary batteries having high energy density has increased.

Together with this, research on improvement in safety of lithium secondary batteries and an increase in voltage thereof has been actively conducted in order to use the lithium secondary batteries in power storage apparatuses and electric vehicles, each of which requires a large-capacity, high-output energy source.

A lithium ion secondary battery, which is a kind of lithium secondary battery, has advantages in that the lithium ion secondary battery has higher energy density, a lower self-discharge rate, and a longer lifespan than a nickel manganese battery or a nickel cadmium battery; however, a safety-related problem due to overheating and a low-output problem are pointed out as disadvantages thereof.

In order to solve such problems of the lithium ion secondary battery, an all-solid-state battery is presented as an alternative. The all-solid-state battery may be configured to have a structure in which a positive electrode layer including a solid electrolyte and a negative electrode layer including a solid electrolyte are formed on opposite surfaces of a solid electrolyte film and in which a current collector is coupled to each electrode.

In the lithium secondary battery, lithium ions that move from the positive electrode to the negative electrode during the initial charging and discharging process thereof are attached to the negative electrode as the result of reaction with the negative electrode, and lithium ions that have reacted with an electrolytic solution form a solid electrolyte interface (SEI) film on the surface of a negative electrode active material. As described above, some of the lithium ions moved to the negative electrode during the initial charging process remain on the negative electrode and do not move to the positive electrode during the discharging process. That is, some of the lithium ions become irreversible lithium ions.

During the charging and discharging process of the secondary battery, the SEI film may be broken and removed from the surface of the negative electrode active material due to expansion and contraction of the negative electrode active material, and additional lithium is continuously consumed as irreversible lithium ions in order to replenish the removed SEI film. This remarkably reduces the capacity of the battery and thus shortens the lifespan of the battery.

A variety of research has been conducted in order to manufacture a stable SEI film that is not broken or separated from the negative electrode active material in spite of expansion and contraction of the negative electrode active material due to charging and discharging, thus reducing the irreversible capacity of lithium ions.

Patent Document 1 discloses a method of manufacturing a negative electrode material, the method including pressing and stacking a solid electrolyte layer having high lithium ion conductivity on the surface of a positive electrode material made of a mixture of a positive electrode active material and a solid electrolyte having high lithium ion conductivity, stacking a negative electrode material made of a mixture of a negative electrode active material and a solid electrolyte having high lithium ion conductivity on the surface of the stacked solid electrolyte layer to form a stack, encapsulating the stack in an envelope-shaped container, and applying a predetermined level of voltage to the stack to dope the negative electrode material with lithium ions.

In Patent Document 1, the negative electrode material is doped with lithium ions in advance; however, a method of stacking the positive electrode, the solid electrolyte layer, and the negative electrode, applying voltage to the stack in order to dope the negative electrode material with lithium ions, and stacking the negative electrode material doped with lithium ions on a new positive electrode to manufacture an electrode assembly is used. The positive electrode material is necessary for preliminary doping with lithium ions, whereby a manufacturing process is complicated.

Patent Document 2 discloses a method of pre-lithiating a silicon oxide negative electrode for secondary batteries, the method including a first step of soaking a silicon oxide negative electrode for secondary batteries in an electrolytic solution to wet the silicon oxide negative electrode for secondary batteries and a second step of performing direct contact between the wet silicon oxide negative electrode for secondary batteries and lithium metal.

The method disclosed in Patent Document 2 is a method of manufacturing a negative electrode that is used for a secondary battery that uses a liquid electrolyte; however, a method of manufacturing a desired SEI film in a secondary battery that uses a solid electrolyte is not disclosed.

Patent Document 3 discloses a preliminary lithium doping method including a process of mixing a lithium-dopable material and lithium metal in the presence of a solvent to dope the lithium-dopable material with lithium and a process of mixing the lithium-dopable material and the lithium metal through collision and friction with balls during the above process.

Patent Document 3 discloses a process of doping a negative electrode active material with lithium; however, a method of forming an SEI film on the surface of the negative electrode active material is not disclosed.

As described above, technology for reducing the irreversible capacity of lithium and forming a desired SEI film as a concrete solution in connection with a negative electrode active material for all-solid-state batteries has not yet been proposed.

PRIOR ART DOCUMENTS (Patent Document 1) Japanese Registered Patent Publication No. 5435469 (2013 Dec. 20)

(Patent Document 2) Korean Patent Application Publication No. 2018-0127044 (2018 Nov. 28)
(Patent Document 3) Japanese Patent Application Publication No. 2012-204306 (2012 Oct. 22)

DISCLOSURE

Technical Problem

The present invention has been made in view of the above problems, and it is an object of the present invention to provide a method of manufacturing a negative electrode for all-solid-state batteries capable of forming an SEI film on the surface of a negative electrode active material before an electrode assembly for all-solid-state batteries is manufactured in order to minimize the irreversible capacity of lithium, thereby improving lifespan characteristics of the battery and preventing a reduction in capacity of the battery.

Technical Solution

In order to accomplish the above object, the present invention provides a method of manufacturing a negative electrode for all-solid-state batteries, the method including (a) preparing a powder mixture including a negative electrode active material, a solid electrolyte, and a conductive agent, (b) introducing the powder mixture into a reactor, (c) introducing an electrolytic solution into the reactor, and (d) forming a solid electrolyte interface (SEI) film while rotating the reactor, wherein the inner surface of the reactor is treated with lithium metal.

The lithium metal on the inner surface of the reactor may react with the electrolytic solution to form the SEI film.

Step (c) may further include adding an additive.

The reactor having the powder mixture introduced thereinto may be rotated to increase the contact surface between the negative electrode active material and the lithium metal before the electrolytic solution is introduced.

Step (b) and step (c) may be simultaneously performed, and the SEI film may be uniformly formed on the surface of the negative electrode active material.

The electrolytic solution may be a cyclic carbonate-based electrolytic solution.

Step (d) may include heating the reactor.

The method may further include washing and drying the materials in the reactor after step (d).

The method may further include filtering the residue using a sieve after the drying.

The solid electrolyte may be an oxide-based solid electrolyte, a sulfide-based solid electrolyte, or a polymer-based solid electrolyte.

The SEI film may include a main product and a by-product, and the main product may consist of an organic material including lithium, the main product being stably maintained in the state of being attached to the negative electrode active material.

In addition, the present invention provides an electrode assembly configured to have a structure in which a negative electrode manufactured using the method, a solid electrolyte film, and a positive electrode are stacked.

DESCRIPTION OF DRAWINGS

FIG. 1 is a vertical sectional view schematically showing a reactor according to the present invention.

FIG. 2 is a graph showing the results of first cycle charging and discharging of coin half cells manufactured according to Example and Comparative Example.

FIG. 3 is a graph showing cycle retention based on the number of times of charging and discharging of the coin half cells manufactured according to Example and Comparative Example.

BEST MODE

A lithium secondary battery is a secondary battery that is capable of being repeatedly charged and discharged, wherein lithium ions move from a positive electrode to a negative electrode at the time of charging and the lithium ions move from the negative electrode to the positive electrode at the time of discharging, whereby electrons move and thus current flows.

Generally, in the case of a lithium secondary battery that uses a liquid electrolyte, the lithium ions that have moved to the negative electrode in an initial activation step react with an electrolytic solution and an additive, whereby a solid electrolyte interface (SEI) film is formed on the surface of the negative electrode. The formed SEI film is diversified in kind and mechanism depending on the kind of the electrolytic solution and the additive.

Specifically, the SEI film may be formed in Stage I reaction and Stage II reaction depending on the formation steps thereof. Generally, in the case in which the initial voltage of the negative electrode is 1.3 V or higher, Stage I reaction is predominantly performed, and, in the case in which the initial voltage of the negative electrode is lower than 1.3 V, Stage II reaction is performed.

The SEI film formed in Stage I reaction consists of an inorganic material. For example, an SEI film formed of LiF is very unstable and thus is easily decomposed. As described above, the SEI film formed in Stage I reaction may be broken due to expansion and contraction of a negative electrode active material during a charging and discharging process of the secondary battery, whereby the SEI film may be removed from the surface of the negative electrode active material, and additional lithium is continuously consumed as irreversible lithium ions in order to replenish the removed SEI film. This remarkably reduces the capacity of the battery and thus shortens the lifespan of the battery.

In addition, $Li_2O$ or $Li_2CO_3$, which is a reaction product generated in Stage I reaction, reacts with the electrolytic solution, whereby gas is generated. As a result, a swelling phenomenon of the battery may rapidly occur.

On the other hand, the SEI film formed in Stage II reaction consists of an organic material, which is not easily broken due to expansion and contraction of the negative electrode active material and is maintained in a stable state.

Preferably, therefore, Stage II reaction is lengthened or Stage I reaction is shortened in order to form a stable SEI film that is neither broken nor separated.

Generally, in the case of a lithium ion secondary battery that uses a liquid electrolyte, a mixture of various kinds of electrolytic solutions and additives are used, whereby both Stage I reaction and Stage II reaction are performed. As a result, two kinds of SEI films may be formed together.

Meanwhile, in the case of a lithium secondary battery that uses a solid electrolyte, a mixture including a powder type negative electrode active material, a solid electrolyte, and a conductive agent is used, whereby it is expected that Stage II reaction due to a liquid electrolyte or an additive is hardly performed and only Stage I reaction due to lithium ions is slightly performed. As a result, a stable SEI film according to Stage II reaction cannot be formed on a negative electrode for solid electrolyte batteries.

Also, in the case of an all-solid-state battery, an SEI film is formed due to Stage I reaction in which lithium ions that have moved to a negative electrode in an initial activation process are collected as the result of reaction with the negative electrode or a solid electrolyte. Some of the lithium ions that have moved to the negative electrode do not return to a positive electrode, i.e. a reversible reaction thereof is not performed. In particular, the irreversible capacity of the all-solid-state battery varies depending on the kind of the solid electrolyte. For example, in the case of a polymer-based solid electrolyte, the observed irreversible capacity of the lithium ions reaches 20% to 30%.

In the case in which the irreversible capacity of the lithium ions is increased, as described above, the capacity of the battery is reduced. In the case in which a pre-lithiation reaction of forming an SEI film on the negative electrode is performed before the initial activation process is performed after an electrode assembly is assembled, it is possible to prevent lithium ions from being consumed to initially form the SEI film after the secondary battery is assembled.

A method of manufacturing a negative electrode for all-solid-state batteries according to the present invention is characterized in that a powder mixture including a negative electrode active material, a solid electrolyte, and a conductive agent is prepared (step (a)) and the powder mixture is introduced into a rotatable cylindrical reactor having an inner surface treated with lithium metal (step (b)) to form an SEI film due to Stage I reaction in advance.

Alternatively, an electrolytic solution may be introduced into the reactor (step (c)) to perform a process of forming an SEI film in a lithium secondary battery that uses a liquid electrolyte. In the case in which the lithium metal on the inner surface of the reactor is dissolved in the electrolytic solution to generate lithium ions, the lithium ions may react with the electrolytic solution, whereby the SEI film may be formed on the surface of the negative electrode active material.

In connection therewith, FIG. 1 is a vertical sectional view showing a reactor according to the present invention.

Referring to FIG. 1, the reactor, which has a cylindrical structure, has an inner surface treated with lithium metal, and performs a reaction while being rotated about the center of the cylinder as an axis.

A negative electrode active material, a solid electrolyte, and a conductive agent are introduced into the reactor in the form of particles, an electrolytic solution is additionally introduced into the reactor, and stirring is performed while the reactor is rotated. As a result, the negative electrode active material, lithium ions, and the electrolytic solution may react with each other, whereby an SEI film may be formed on the surface of the negative electrode active material.

Alternatively, stirring may be performed while the reactor is rotated before an electrolytic solution is additionally introduced into the reactor in order to form an SEI film due to Stage I reaction on the surface of the negative electrode active material, and then an electrolytic solution may be added to the reactor in order to perform a process of forming an SEI film due to Stage II reaction.

In the case in which the rotatable cylindrical reactor is used, as described above, it is possible to form an SEI film on the surface of a large-capacity negative electrode active material and to obtain a uniform reaction product, compared to the case in which an SEI film is formed using a method of performing surface-to-surface contact between a negative electrode active material and lithium metal in the state in which the negative electrode active material is widely disposed in a planar structure.

In the present invention, when the powder mixture is introduced into the reactor first and then the reactor is rotated, lithium ions separated from the lithium metal on the inner surface of the reactor are mixed with the negative electrode active material. Since the area of the negative electrode active material that reacts with the lithium ions is increased, it is possible to obtain a negative electrode active material on which an SEI film has been uniformly formed.

Subsequently, when an electrolytic solution is introduced into the reactor, the lithium ions may react with the electrolytic solution, whereby an SEI film due to Stage II reaction may be formed on the surface of the negative electrode active material. In the case in which the voltage of the negative electrode is reduced to lower than 1.3 V as the result of formation of the SEI film due to Stage I reaction in step (b), only Stage II reaction may be performed, whereby an SEI film having stable properties may be formed.

In the case in which step (b) and step (c) are sequentially performed, Stage I reaction may be performed in step (b), and Stage II reaction may be performed in step (c). Since only a source for Stage II reaction is used in step (c), Stage I reaction may be slightly performed, whereas Stage II reaction may be predominantly performed.

Meanwhile, in Stage I reaction, the lithium ions are movable only through the solid electrolyte, whereby the movement path of the lithium ions is increased, and therefore the reaction is performed for a long time.

Alternatively, step (b) and step (c) may be simultaneously performed. In this case, Stage I reaction and Stage II reaction may be simultaneously performed without distinction therebetween. Also, in both Stage I reaction and Stage II reaction, the lithium ions are transferred through the electrolytic solution, whereby rapid reactions may be performed.

In such a case, however, relatively rapid Stage I reaction may be performed, compared to the case in which step (b) and step (c) are sequentially performed. Consequently, a component of the electrolytic solution that may be used as a source for Stage I reaction may be minimized, for example a cyclic carbonate-based electrolytic solution may be used as the electrolytic solution, such that Stage II reaction is performed as a main reaction.

In step (c), an additive may be further added. For example, the additive may be at least one selected from the group consisting of vinyl carbonate, vinyl ethylene carbonate, fluoroethylene carbonate, and succinonitrile. The additive reacts with the lithium ions together with the electrolytic solution to form an SEI film consisting of an organic material, whereby a stable SEI film may be formed.

As described above, two kinds of SEI films may be formed on the negative electrode manufactured according to the present invention, wherein each of the SEI films includes a main product and a by-product. The main product consists of an organic material including lithium and thus is stably maintained in the state of being attached to the negative electrode active material.

Consequently, it is possible to prevent lithium ions from being consumed in order to additionally form the SEI film, whereby it is possible to minimize a reduction in lifespan of the battery and to prevent the negative electrode active material from being oxidized or decomposed by air, etc.

Preferably, in the present invention, Stage I reaction is performed for a short time, and Stage II reaction is performed for a long time. In the case in which the temperature of the reactor is high, Stage I reaction may be performed for a short time. Consequently, step (d) may include a process of heating the reactor. For example, the temperature of the reactor may be maintained within a range of 45° C. to 70° C. In the case in which the temperature of the reactor is higher than 70° C., the SEI film may be decomposed, which is undesirable. In the case in which the temperature of the reactor is lower than 45° C., it is difficult to achieve the effect of shortening Stage I reaction, which is also undesirable.

After the process of forming the SEI film in the reactor is completed, as described above, the materials in the reactor may be washed and then dried in order to completely remove the electrolytic solution and the additive therefrom.

In general, the particle diameter of lithium metal is a few mm, which is a relatively large size, compared to the particle diameters of the negative electrode active material, the solid electrolyte, and the conductive agent, which are several tens of micrometers. Consequently, a process of filtering the residue using a sieve may be performed in order to remove only the lithium metal from the solid content and thus to obtain a powder mixture for negative electrodes.

The cyclic carbonate-based electrolytic solution may be at least one selected from the group consisting of ethylene carbonate (EC) and propylene carbonate (PC).

The solid electrolyte may be a sulfide-based solid electrolyte, an oxide-based solid electrolyte, or a polymer-based solid electrolyte.

It is preferable for the sulfide-based solid electrolyte to contain a sulfur atom (S), to exhibit ion conductivity of metal belonging to Group 1 or 2 of the periodic table, and to exhibit high electron insulation. It is preferable for the sulfide-based solid electrolyte to contain at least Li, S, and P as elements and to exhibit high lithium ion conductivity; however, elements other than Li, S, and P may be included depending on purposes or circumstances.

Concrete examples of the sulfide-based inorganic solid electrolyte are as follows. For example, $Li_2S$—$P_2S_5$, $Li_2S$—$P_2S_5$—LiCl, $Li_2S$—$P_2S_5$—$H_2S$, $Li_2S$—$P_2S_5$—$H_2S$—LiCl, $Li_2S$—LiI—$P_2S_5$, $Li_2S$—LiI—$Li_2O$—$P_2S_5$, $Li_2S$—LiBr—$P_2S_5$, $Li_2SLi_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SiS_2$—LiCl, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2SSiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2SSiS_2$—$Li_3PO_4$, or $Li_{10}GeP_2S_{12}$ may be used.

For example, an amorphization method may be used as a method of synthesizing the sulfide-based inorganic solid electrolyte material. Examples of the amorphization method include a mechanical milling method, a solution method, and a melting and rapid cooling method. Thereamong, the mechanical milling method is preferably used, since it is possible to process the sulfide-based inorganic solid electrolyte at a normal temperature (25° C.) and to simplify the manufacturing process.

It is preferable for the oxide-based solid electrolyte to contain an oxygen atom (O), to exhibit ion conductivity of metal belonging to Group 1 or 2 of the periodic table, and to exhibit high electron insulation.

As the oxide-based solid electrolyte, for example, there may be used $Li_{xa}La_{ya}TiO_3$ (xa=0.3 to 0.7 and ya=0.3 to 0.7) (LLT), $Li_{xb}La_{yb}Zr_{zb}M^{bb}_{mb}O_{nb}$ (here, $M^{bb}$ is at least one of Al, Mg, Ca, Sr, V, Nb, Ta, Ti, Ge, In, or Sn, xb satisfies 5≤xb≤10, yb satisfies 1≤yb≤4, zb satisfies 1≤zb≤4, mb satisfies 0≤mb≤2, and nb satisfies 5≤nb≤20), $Li_{xc}B_{yc}M^{cc}_{zc}O_{nc}$ (here, $M^{cc}$ is at least one of C, S, Al, Si, Ga, Ge, In, or Sn, xc satisfies 0≤xc≤5, yc satisfies 0≤yc≤1, zc satisfies 0≤zc≤1, and nc satisfies 0≤nc≤6), $Li_{xd}(Al, Ga)_{yd}(Ti, Ge)_{zd}Si_{ad}O_{nd}$ (here, 1≤xd≤3, 0≤yd≤1, 0≤ad≤2, 0≤ad≤1, 1≤md≤7, and 3≤nd≤13), $Li_{(3-2xe)}M^{ee}_{xe}D^{ee}O$ (here, xe indicates a number between 0 and 0.1, $M^{ee}$ indicates a bivalent metal atom, and $D^{ee}$ indicates a halogen atom or a combination of two or more kinds of halogen atoms), $Li_{xf}Si_{yf}O_{zf}$ (1≤xf≤5, 0<yf≤3, and 1≤zf≤10), $Li_{xg}S_{yg}O_{zg}$ (1≤xg≤3, 0<yg≤2, and 1≤zg≤10), $Li_3BO_3$—$Li_2SO_4$, $Li_2O$—$B_2O_3$—$P_2O_5$, $Li_2O$—$SiO_2$, $Li_6BaLa_2Ta_2O_{12}$, $Li_3PO_{(4-3/2w)}N_w$ (w<1) $Li_{3.5}Zn_{0.25}GeO_4$ having a lithium super ionic conductor (LISICON) type crystalline structure, $La_{0.55}Li_{0.35}TiO_3$ having a perovskite type crystalline structure, $LiTi_2P_3O_{12}$ having a natrium super ionic conductor (NASICON) type crystalline structure, $Li_{1+xh+yh}(Al, Ga)_{xh}(Ti, Ge)_{2-xh}Si_{yh}P_{3-yh}O_{12}$ (here, 0≤xh≤1 and 0≤yh≤1), or $Li_7La_3Zr_2O_{12}$(LLZ) having a garnet type crystalline structure. In addition, a phosphorus compound including Li, P, and O is preferably used. For example, lithium phosphate ($Li_3PO_4$), LiPON in which a portion of oxygen in lithium phosphate is replaced by nitrogen, or LiPOD[1] ($D^1$ being at least one selected from among Ti, V, Cr, Mn, Fe, Co, Ni, Cu, Zr, Nb, Mo, Ru, Ag, Ta, W, Pt, and Au) may be used. In addition, $LiA^1ON$ ($A^1$ being at least one selected from among Si, B, Ge, Al, C, and Ga) is preferably used.

The polymer-based solid electrolyte may be a solid polymer electrolyte formed by adding a polymer resin to a lithium salt that is independently solvated or a polymer gel electrolyte formed by impregnating a polymer resin with an organic electrolytic solution containing an organic solvent and a lithium salt.

The solid polymer electrolyte is not particularly restricted as long as the solid polymer electrolyte particle is made of, for example, a polymer material that is ion conductive and is generally used as a solid electrolyte material of the all-solid-state battery. Examples of the solid polymer electrolyte may include a polyether-based polymer, a polycarbonate-based polymer, an acrylate-based polymer, a polysiloxane-based polymer, a phosphazene-based polymer, polyethylene oxide, a polyethylene derivative, an alkylene oxide derivative, a phosphoric acid ester polymer, poly agitation lysine, polyester sulfide, polyvinyl alcohol, polyvinylidene fluoride, and a polymer containing an ionic dissociation group. In a concrete embodiment of the present invention, the solid polymer electrolyte may include: a branch-like copolymer formed by copolymerizing an amorphous polymer, such as polymethylmethacrylate (PMMA), polycarbonate, polysiloxane, and/or phosphazene, which is a comonomer, in the main chain of a polyethylene oxide (PEO), which is a polymer resin; a comb-like polymer resin; and a crosslinking polymer resin.

The polymer gel electrolyte includes an organic electrolytic solution including a lithium salt and a polymer resin, wherein the organic electrolytic solution is included in an amount of 60 parts by weight to 400 parts by weight based on weight of the polymer resin. Although the polymer resin applied to the polymer gel electrolyte is not limited to specific components, a polyvinylchloride (PVC)-based resin, a polymethylmethacrylate (PMMA)-based resin, polyacrylonitrile (PAN), polyvinylidene fluoride (PVdF), and polyvinylidene fluoride hexafluoropropylene (PVdF-HFP) may be included.

The lithium salt is a lithium salt that can be ionized and may be represented by $Li^+X^-$. Although a negative ion of the lithium salt is not particularly restricted, $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, or $(CF_3CF_2SO_2)_2N^-$ may be illustrated.

In addition, the present invention provides an electrode assembly configured to have a structure in which a negative electrode manufactured using the method of manufacturing the negative electrode for all-solid-state batteries, a solid electrolyte film, and a positive electrode are stacked.

The electrode assembly according to the present invention is manufactured using a negative electrode having an SEI film formed thereon in advance, and therefore no additional process of forming an SEI film is performed at the time of initial charging and discharging of a battery after assembly of the battery. Consequently, it is possible to prevent the occurrence of a conventional problem in that irreversible lithium is generated as the result of the SEI film being formed at the time of initial charging and discharging of the battery after assembly of the battery, whereby the capacity and lifespan of the battery are reduced.

The positive electrode and the negative electrode may be a positive electrode and a negative electrode that are commonly used in a secondary battery, respectively.

A positive electrode active material that is used for the positive electrode is not particularly restricted as long as the positive electrode active material is capable of reversibly storing and releasing lithium ions. For example, the positive electrode active material may be a layered compound, such as lithium cobalt oxide ($LiCoO_2$), lithium nickel oxide ($LiNiO_2$), $Li[Ni_xCo_yMn_zM_v]O_2$ (in this equation, M is one or two or more selected from the group consisting of Al, Ga, and In; and $0.3 \leq x < 1.0$, $0 \leq y$, $z \leq 0.5$, $0 \leq v \leq 0.1$, $x+y+z+v=1$), $Li(Li_aM_{b-a-b}M'_{b'})O_{2-c}A_c$ (in this equation, $0 \leq a \leq 0.2$, $0.6 \leq b \leq 1$, $0 \leq b' \leq 0.2$, $0 \leq c \leq 0.2$; M includes Mn and at least one selected from the group consisting of Ni, Co, Fe, Cr, V, Cu, Zn, and Ti; M' is at least one selected from the group consisting of Al, Mg, and B; and A is at least one selected from the group consisting of P, F, S, and N) or a compound substituted with one or more transition metals; a lithium manganese oxide represented by the chemical formula $Li_{1+y}Mn_{2-y}O_4$ (where y=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiFe_3O_4$, $V_2O_5$, or $Cu_2V_2O_7$; an Ni-sited lithium nickel oxide represented by the chemical formula $LiNi_{1-y}M_yO_2$ (where M=Co, Mn, Al, Cu, Fe, Mg, B, or Ga, and y=0.01 to 0.3); a lithium manganese composite oxide represented by the chemical formula $LiMn_{2-y}M_yO_2$ (where M=Co, Ni, Fe, Cr, Zn, or Ta, and y=0.01 to 0.1) or the chemical formula $Li_2Mn_3MO_8$ (where M=Fe, Co, Ni, Cu, or Zn); $LiMn_2O_4$ in which a portion of Li in the chemical formula is replaced by alkaline earth metal ions; a disulfide compound; or $Fe_2(MoO_4)_3$. However, the present invention is not limited thereto.

A carbon material capable of storing and releasing lithium ions, lithium metal, silicon, or tin may be generally used as a negative electrode active material that is used for the negative electrode. Preferably, the carbon material is used. Both low crystalline carbon and high crystalline carbon may be used as the carbon material. Typical examples of the low crystalline carbon include soft carbon and hard carbon. Typical examples of the high crystalline carbon include various kinds of high-temperature sintered carbon, such as natural graphite, Kish graphite, pyrolytic carbon, mesophase pitch based carbon fiber, meso-carbon microbeads, mesophase pitches, and petroleum or coal tar pitch derived cokes.

In each of the positive electrode and the negative electrode, a binder is used as a component assisting in binding between the electrode active material and the conductive agent and in binding with a current collector. As examples of the binder, polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers may be used.

Hereinafter, the present invention will be described with reference to the following example. The example is provided only for easier understanding of the present invention and should not be construed as limiting the scope of the present invention.

Example

A powder mixture including artificial graphite, as a negative electrode active material, carbon black, as a conductive agent, and polyethylene oxide (PEO), as a solid electrolyte, was prepared, and the powder mixture was introduced into a reactor having an inner surface treated with lithium metal as shown in FIG. 1.

An electrolytic solution including a mixture of ethylene carbonate and propylene carbonate was additionally introduced into the reactor, and then a reaction for forming an SEI film was performed while the reactor was rotated at 25° C. for 60 minutes.

A reaction product generated in the reactor was collected, washed, dried, and filtered using a sieve in order to separate the negative electrode active material, the conductive agent, and the solid electrolyte from the reaction product excluding the lithium metal.

83 wt % of artificial graphite, as the negative electrode active material obtained from the powder mixture separated as described above, 1 wt % of carbon black, as the conductive agent, 13 wt % of polyethylene oxide, as the solid electrolyte, and 3 wt % of a mixture of styrene butadiene rubber and carboxymethyl cellulose, as a binder were dissolved in acetonitrile (AN) to manufacture a negative electrode slurry.

The negative electrode slurry was coated on a nickel foil and was then dried to manufacture a negative electrode.

Polyethylene oxide and LiTFSI, as a lithium salt, were mixed with each other at a ratio of 20 mol:1 mol, were dissolved in acetonitrile, were thinly cast on a glass plate, and were then dried under vacuum to manufacture a solid electrolyte film having a thickness of 30 μm.

A coin half cell was manufactured using the negative electrode and the solid electrolyte film.

Comparative Example

A coin half cell was manufactured using the same method as in Example except that a powder mixture including artificial graphite, carbon black, and polyethylene oxide that were not subjected to a reaction for forming an SEI film in a reactor treated with lithium metal was used, unlike Example.

(Experimental Example 1) Initial Capacity Evaluation Test

A process of performing constant current/constant voltage (CC/CV) charging at 0.05 C with respect to the coin half cells manufactured according to Example and Comparative Example until voltage at the time of cut off was 0.005 V and C-rate was 0.02 C and performing discharging until voltage was 1.5 V at 0.05 C was performed once. The results of first cycle charging and discharging are shown in FIG. 2.

Referring to FIG. 2, it can be seen that, as the result of comparison in initial efficiency between the coin half cells manufactured according to Example and Comparative Example, Comparative Example exhibits an initial efficiency of about 58%, whereas Example exhibits an initial efficiency of about 66%.

Consequently, it can be seen that, in the case in which a negative electrode having an SEI film formed thereon before the assembly of a battery is used, as in the present invention, initial efficiency is remarkably improved.

(Experimental Example 2) Cycle Retention Evaluation Test

Cycle retention based on the number of times of charging and discharging was measured while charging and discharging were repeatedly performed under the same conditions as in Experimental Example 1. The results are shown in FIG. 3.

Referring to FIG. 3, which shows cycle retention based on the number of times of charging and discharging on the assumption that the capacity at the second cycle is 100%, it can be seen that Example has a cycle retention effect at least about 5.5% higher than Comparative Example at and after eight cycles.

Consequently, it can be seen that, in the case in which a battery including the negative electrode manufactured according to Example is used, the lifespan of the battery is remarkably increased.

Those skilled in the art to which the present invention pertains will appreciate that various applications and modifications are possible based on the above description without departing from the scope of the present invention.

INDUSTRIAL APPLICABILITY

As is apparent from the above description, a method of manufacturing a negative electrode for all-solid-state batteries according to the present invention is capable of achieving contact between a large amount of negative electrode active material and lithium ions through a process of rotating a cylindrical reactor, whereby it is possible to manufacture a large-capacity negative electrode for all-solid-state batteries.

In addition, a process of introducing a negative electrode powder mixture for all-solid-state batteries into an electrolytic solution is included, whereby it is possible to form a stable SEI film on the surface of the negative electrode active material, and therefore it is possible to solve a problem in that it is not possible to form a stable SEI film in an all-solid-state battery that generally uses no electrolytic solution.

Furthermore, an electrode assembly is assembled using a negative electrode active material having an SEI film formed on the surface thereof. Consequently, a battery decomposition process for analyzing the SEI film is unnecessary, unlike a conventional battery in which an SEI film is formed on a negative electrode after assembly of an electrode assembly, and therefore a problem in that the SEI film reacts with air and thus an additional reaction is performed with respect to the SEI film during the decomposition process does not occur, whereby it is possible to easily analyze the SEI film.

The invention claimed is:

1. A method of manufacturing a negative electrode for all-solid-state batteries, the method comprising:
    step (a) preparing a powder mixture comprising a negative electrode active material, a solid electrolyte, and a conductive agent;
    step (b) introducing the powder mixture into a reactor having its inner surface previously treated with a lithium metal, rotating the resultant reactor, and forming a first solid electrolyte interface (SEI) film;
    step (c) introducing an electrolytic solution into the reactor obtained from step (b); and
    step (d) forming a second solid electrolyte interface (SEI) film while rotating the reactor obtained from step (c).

2. The method according to claim 1, wherein step (c) further comprises adding an additive.

3. The method according to claim 1, wherein the electrolytic solution is a cyclic carbonate-based electrolytic solution.

4. The method according to claim 1, wherein step (d) comprises heating the reactor.

5. The method according to claim 1, further comprising washing and drying materials in the reactor after step (d).

6. The method according to claim 5, further comprising filtering a residue using a sieve after the drying.

7. The method according to claim 1, wherein the solid electrolyte is an oxide-based solid electrolyte, a sulfide-based solid electrolyte, or a polymer-based solid electrolyte.

8. The method according to claim 1, wherein
    the second SEI film comprises a main product and a by-product, and
    the main product consists of an organic material comprising lithium, and the main product is stably maintained in a state of being attached to the negative electrode active material.

9. The method according to claim 2, wherein the additive is at least one selected from the group consisting of vinyl carbonate, vinyl ethylene carbonate, fluoroethylene carbonate, and succinonitrile.

10. The method according to claim 4, wherein the reactor is heated to maintain in a temperature of 45° C. to 70° C.

* * * * *